May 10, 1960 E. A. KOBETICH ET AL 2,936,367
TRANSISTOR TRANSCEIVER
Filed April 2, 1956
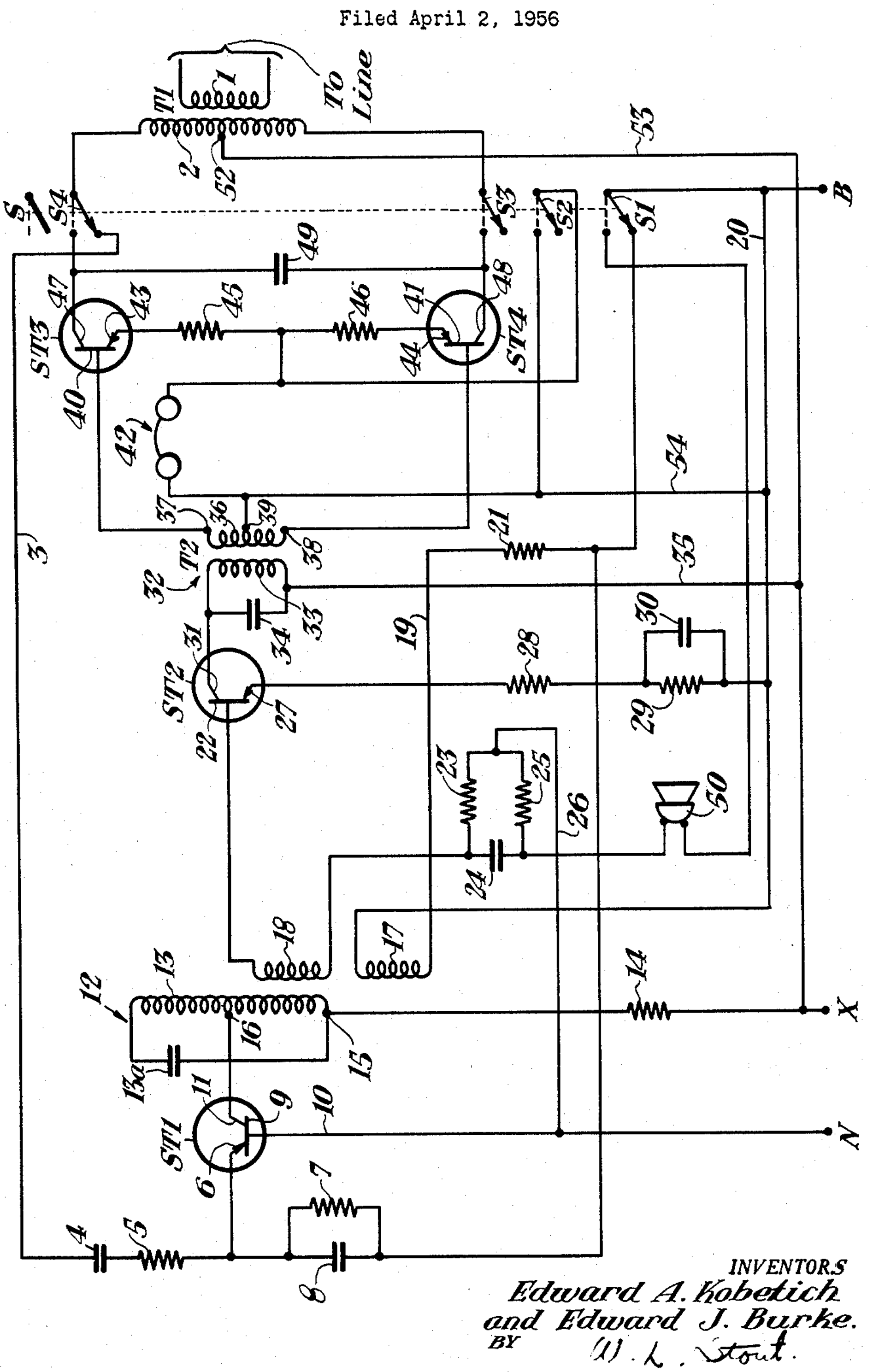
INVENTORS
Edward A. Kobetich
and Edward J. Burke.
BY W. L. Stout.
THEIR ATTORNEY United States Patent Office 2,936,367

Patented May 10, 1960

2,936,367

TRANSISTOR TRANSCEIVER

Edward A. Kobetich, Braddock Hills, Pa., and Edward J. Burke, Ithaca, N.Y., assignors to Westinghouse Air Brake Company, Wilmerding, Pa., a corporation of Pennsylvania Application April 2, 1956, Serial No. 575,625

10 Claims. (Cl. 250—13)

Our invention relates to a transistor transceiver, and more particularly to a dual purpose stage in the transistor transceiver capable of acting as an amplifier under one set of conditions while acting as a detector under another set of conditions.

With some previous transceiver circuits only a portion of the stages involved in the transmitter operation are used in the receiver operation and vice versa. This means that in order to get the same or desired amount of transmitter amplification it is necessary to provide a greater number of stages or be satisfied with a specified number of stages and a corresponding reduction in the amount of amplification of the signal being handled, since the receiver detectors could not previously be used as amplifiers.

It is therefore an object of our invention to provide a transceiver in which all stages perform a function whether the transceiver is being used as a transmitter or a receiver.

It is another object of our invention to provide a push-pull transistor output stage capable of functioning as a full wave detector circuit or as a push-pull amplifier.

It is another object of our invention to provide a transceiver that is capable of performing its operations with the least number of elements.

Another object of our invention is to provide a transceiver that is inexpensive to manufacture and maintain.

Other objects, purposes, and characteristic features of our invention will become obvious from the specification and drawings as the description progresses.

In practicing our invention, we provided a transceiver having three stages. During the time that the three stages are used as a transmitter the first stage acts as an oscillator, the second stage as a class A amplifier, and the third stage as a class B push-pull output stage. When the transceiver is being used as a receiver the first stage is used as a class A amplifier, the second stage as a class A amplifier, and the previous output stage is arranged to act as a full wave detector, for sound producing elements. The change over from transmitter to receiver is accomplished through switching devices as will be explained hereinafter.

The accompanying drawing is a diagrammatic view of one form of transceiver embodying our invention.

Similar reference characters refer to similar parts in the drawing.

Referring to the drawing, the transceiver is shown in a receiving condition capable of receiving incoming signals, that is, each of the contacts of the switch S is in proper position for conditioning the equipment for receiving incoming signals. The equipment comprises an input transformer T1 with a winding 1 connected to a pair of line wires (not shown) and a winding 2 provided with a center tap connected to a source of power (not shown). One end of the winding 2 is connected through a contact S4 of the switch S, a conductor 3, a direct current blocking condenser 4, and a loading resistor 5 to the emitter 6 of a transistor ST1. The center tap 52 is connected to the terminal X of the source of power. The transistor ST1 is provided with three electrodes, namely, the emitter 6, a base 9 and a collector 11.

The emitter 6 of the transistor ST1 is provided with a bias circuit which comprises a resistor 7 in parallel with a capacitor 8, contact S1 of the switch S, the positive terminal B of a suitable source of power (not shown), the source of power, terminal N of the source of power, and conductor 10 to the base 9 of the transistor ST1.

The collector 11 of the transistor ST1 is provided with a parallel tuned circuit 12 comprising an inductor or winding 13 and parallel capacitor 13*a*. A negative terminal X of the source of power is then connected through a current limiting resistor 14 to a point 15 in the parallel tuned circuit 12. It should be pointed out at this time that the collector 11 of the transistor ST1 is connected to a center tap 16 on the winding 13 in order to reduce the effect of loading of the tuned circuit by the transistor ST1. This allows the use of a high Q (highly selective) tuned circuit without the transistor loading the tuned circuit and excessively reducing its Q.

Coupled with the winding 13 of the tuned circuit 12 in the collector 11 circuit of the transistor ST1 is a pair of windings 17 and 18. The winding 17 is provided with a closed path including the conductors 19 and 20, the low value resistance 21, and the contact S1 of the switch S. With the switch contact S1 closed in the position shown in the drawing the winding 17 acts to reflect resistance into the tuned circuit comprising the inductor 13 and the condenser 13*a*, causing the circuit to lower its Q value and be responsive to a wider band of frequencies, for the reason to be explained hereinafter.

The mutually coupled winding 18 is connected into the base to emitter circuit of the three electrode transistor ST2 and is used to transfer any incoming signal energy from the tuned circuit 12 into the amplifier circuit of the transistor ST2. In series with the coil 18 and the source terminal N of the source of power is a current limiting resistor 23, having in parallel therewith, a condenser 24 and resistor 25, the function of which will be explained hereinafter in connection with the transmitter operation.

The emitter 27 of the transisor ST2 is connected through a degenerative resistor 28 (used to reduce distortion in the amplifying stage) and a current limiting resistor 29 in parallel with a by-pass capacitor 30, to the B+ terminal of the source of power. The collector 31 is connected to a tuned circuit 32 comprising transformer T2 winding 33 and parallel capacitor 34. This tuned circuit is tuned to the selected or desired frequency band. The tuned circuit is then in turn connected to the negative terminal X of the source of power by a conductor 35. It can be seen, therefore, that the source of power is provided with a direct current path from the negative terminal X through the conductor 35, winding 33 of the tuned circuit 32, to the collector 31 of the transistor ST2. Coupled to the transformer T2 winding 33 is the winding 36 provided with end taps 37 and 38 and a center tap 39.

The end taps 37 and 38 are connected to the bases 40 and 41 of the transistors ST3 and ST4, respectively. The center tap 39 is connected through an audio responser or receiver 42, provided with a now open parallel switch S contact S2, to each of the emitters 43 and 44 of the transistors ST3 and ST4, respectively. Positioned between the receiver 42 and the emitters 43 and 44 are resistances 45 and 46 which allow the use of unmatched transistors in a push-pull arrangement by allowing the circuit to be balanced through different resistance values. The collectors 47 and 48 of the transistors ST3 and ST4, respectively, are then connected to terminals of the now open switch S contacts S4 and S3, thus preventing these elements from functioning while the transceiver is in receive condition.

Signal energy will now be traced through this receiver as just described, to better show the function of the different parts.

A modulated signal being received from the line wires (not shown) and being developed across the winding 1 of the transformer T1 is induced into the upper half of the winding 2 of the transformer T1, passes through the switch contact S4 closed in the position shown in the drawing, conductor 3, direct current blocking condenser 4, and the impedance matching resistor 5 to the emitter 6 of the transistor ST1. With the center tap 52 being connected to the base 9 through the conductor 53, source terminal X, through the source of terminal N, conductor 10 and to the base 9, it is apparent that the signal voltage is developed between the emitter 6 and the base 9 of the transistor ST1 causing the transistor to become active. The signal frequency energy within the collector 11 circuit is developed in the tuned circuit 12. This energy is then induced into the windings 17 and 18. The winding 17 is provided with a low resistance shunt, and therefore reflects loading into the tuned circuit causing the tuned circuit to reduce its Q. This makes the tuned circuit less selective and capable of rseponding to a broader band of frequencies. The incoming modulated signal is also developed across the winding 18 in the base to emitter circuit of the transistor ST2 causing amplified signal frequencies to appear in the collector 31 circuit of the transistor ST2. This produces a resultant amplified modulated signal in the tuned circuit 32 of the collector circuit. The transistor ST2 is provided with fixed bias and is biased for class A operation, therefore, keeping distortion to a minimum. The amplified modulated signal in the tuned circuit 32 is then transferred through mutual coupling to the winding 36 connected in the base circuits of the transistors ST3 and ST4. The collector circuits of the transistors ST3 and ST4 are, however, open at this time causing the transistors to act as detector diodes providing full wave rectification of the incoming modulated signal thus providing signal audio intelligence in the receivers 42.

The circuits will now be traced when the switch S is in its reverse or dotted line position (as shown in the drawings) conditioning the transceiver for transmitting operation.

With the switch S in the transmit or dotted line position the transistor ST1 circuit is connected to form a tuned collector oscillator with feed back energy being fed into the emitter 6 of the transistor. The emitter circuit can be traced from the source terminal B through conductor 20, winding 17, conductor 19, resistor 21, resistor 7 and parallel by-pass condenser 8 to the emitter 6. Since the winding 17 is coupled with the winding 13 of the collector tuned circuit 12, a portion of the energy developed in the tuned circuit 12 is transferred to the winding 17 through the mutual coupling and delivered to the emitter 6 causing the transistor ST1 circuit to function as an oscillator at the frequency of the tuned circuit 12. With the switch contact S1 in its dotted line position it can be seen also that the resistor shunt of the winding 17 has been removed thus removing the reflected resistance from the tuned circuit 12 allowing it to become very high in its Q or selectivity.

Reversal of the switch contact S1 also places the voice transmitter 50 into the base to emitter circuit of the transistor ST2. The direct current voice transmitter circuit can be traced from source terminal B through the contact S1 of the switch S in its reverse position, the voice transmitter 50, resistor 25 and conductor 26 back to the source terminal N. The emitter to base circuit for the transistor ST2 is otherwise the same as was previously recited in connection with the operation of the equipment as a receiver. It can be seen, however, that voice frequencies picked up by the voice transmitter 50 cause an audio voltage to be developed across the resistor 25 which is transferred through the capacitor 24 and impressed along with the carrier oscillator frequency onto the transistor ST2. The collector circuit for the transistor ST2 is unchanged and therefore identical with the circuit as recited previously in connection with use of the equipment as a receiver.

Movement of the contacts S2, S3, and S4 of the switch S, however, changes the operation of the transistors ST3 and ST4 from full wave detector operation to a class B push-pull amplifier. The emitter to base circuit of these transistors may be traced as follows: The transistor ST3 emitter to base circuit can be traced from emitter 43 through the resistor 45, the now closed reverse contact S2 of the switch S to the center tap 39 on the winding 36, through half of the winding to terminal 37 and back to the base of the transistor ST3. The emitter to base circuit of the transistor ST4 can be traced from emitter 44 through the resistor 46, the now closed switch reverse contact S2 to the center tap 39 of the winding 36 and through the other half of the winding to the terminal 38 and to the base 41 of the transistor ST4.

The collector to base circuit of the transistors can be traced as follows. For transistor ST3 starting with the collector 47, the collector is connected through one terminal of the circuit formed by the winding 2 of the transformer T1 and the harmonic reducing condenser 49 connected in parallel therewith by the now closed reverse switch contact S4 of the switch S, one-half of the winding 2 of the transformer T1, the center tap 52, the conductor 53 terminal X of the source, terminal B of the source, conductor 54, center tap 39, and half of the winding 36 to the base 40. The base to collector circuit of the transistor ST4 is identical with the previously traced circuit for the transistor ST3 except that the collector is connected to the opposite side of the transformer winding 2 and the base is connected to the other half of the winding 36.

Operation of the transceiver as a transmitter will be explained.

When the contacts of the switch S are reversed causing each of the individual contacts S1, S2, S3, and S4 to close in its reverse or dotted position it can be seen that the transistor ST1 and its associated circuit is conditioned to operate as an oscillator whose frequency is determined by the tuned circuit of its collector. This is accomplished by the reversal of the switch contact S1 which removes the shunt from the tuned circuit 12 mutually coupled coil 17 and places this coil into the emitter to base circuit of the transistor ST1. This coil then becomes the tickler coil for feed back energy into the emitter of the transistor ST1, causing oscillations to occur.

The contact S1 of the switch S at the same time provides a direct current path for the voice transmitter 50, which can be traced from terminal B of the source of power through the contact S1 of the switch S, the voice transmitter 50, through resistor 25 and conductor 26 back to terminal N of the source of power. The transistor ST2 is provided with the previously traced bias circuit which provides class A amplification.

It can be seen, therefore, that someone speaking into the voice transmitter 50 would then cause an audio voltage to be developed across the resistor 25. The audio voltage is then passed through the condenser 24 and used to vary the amplitude of the carrier frequency being induced by the oscillator circuit into the winding 18 in the base to emitter circuit of the transistor ST2. This modulated signal is then amplified by the transistor ST2 and developed (or impressed) in the tuned circuit 32. The transistor ST2 amplified signal is then transferred through coupling with the tuned circuit 32 to the winding 36 which is situated in the emitter to base circuit of the transistors ST3 and ST4. Since these transistors are biased for class B operation the modulated signal is amplified and transferred through to the collectors 47 and 48 respectively, and appears in the output circuit formed by the condenser 49 and the winding 2 of the transformer T1. The signal energy is then induced into the winding 1 of the transformer T1 and placed on the line circuit (not shown) to be received at a distant receiver (not shown).

It is pointed out at this time that my novel transceiver provides for the use of all transistors within the circuit whether the circuit is being used as a transmitter or a receiver. This means that the signal being produced is provided with adequate amplification without the necessity of providing additional components with part of the components being idle during part of the operation.

Although we have herein shown and described only one form of transceiver embodying our invention, it is to be understood that various changes and modifications may be made therein within the scope of the appended claims without departing from the spirit and scope of our invention.

Having thus described our invention, what we claim is:

1. In a transistor transceiver, a push-pull network comprising a pair of transistors each provided with an emitter electrode, a collector electrode and a base electrode, a load impedance element having two end terminals, a switching means having closed and open positions, the collector electrode of one of said transistors being connected to one of said end terminals and the collector electrode of said other transistor being connected to the other end terminal when said switch means is in the closed position, a center tap on said load impedance element, an input impedance element having two end terminals connected, respectively, to the base electrodes of said pair of transistors and having a center tap connected to the emitters of said pair of transistors through a receiving device having a parallel shunt for at times preventing operation of said receiving device, said push-pull network being conditioned to amplify and supply to said load impedance any signal developed in said input impedance when said switching means is in its closed positions, said network being conditioned to act as a full wave detector and deliver to said receiving device any signal developed in said input impedance element when said switching means is in its open position.

2. In a transceiver, a push-pull network comprising a pair of transistors each provided with a semiconductive body, an emitter electrode, a collector electrode and a base electrode, a load impedance element having two end terminals, a first switching means for connecting said transistor collector electrodes to the respective end terminals when said switching means is closed, means for biasing said collector electrodes to the proper bias level with respect to said base electrodes, an input impedance element having two end terminals connected, respectively, with the base electrodes of the two transistors and having a center tap connected to the emitter electrodes through a sound producing device and a second switching means, said second switching means acting to remove said sound producing device from operation when said first switching means is closed and acting to condition said sound producing device for operation when said first switching means is open, said network being used to amplify incoming signals when said first and second switching means are closed and used to provide full-wave detector operation when said first and second switching means are open.

3. A push-pull transistor circuit comprising a pair of transistors each having an emitter electrode, a collector electrode and a base electrode, an output circuit comprising said collector electrodes and said base electrodes, an input circuit comprising said emitter electrodes and said base electrodes, control means in said emitter to base and collector to base circuits, said control means while in one condition causing said push-pull transistor circuit to operate as an amplifier, said control means while in another condition causing said push-pull transistor circuit to operate as a full wave detector.

4. A push-pull transistor circuit comprising a pair of transistors each having an emitter electrode, a collector electrode and a base electrode, an output circuit comprising said collector electrodes and said base electrodes, an input circuit comprising said emitter electrodes and said base electrodes, control means in said emitter to base and collector to base circuits, said control means while in one condition causing said push-pull transistor circuit to operate as an amplifier, said control means while in another condition causing said push-pull transistor circuit to operate as a full wave detector, and a receiver device connected into said emitter to base circuits when said control means is in its another condition.

5. In a transceiver, a push-pull network comprising a pair of transistors each provided with a semiconductive body, an emitter electrode, a collector electrode and a base electrode, an output transformer winding having two end terminals being at times connected, respectively, to the collector electrodes of the two transistors through a first control means, said first control means acting at other times to disconnect said collector electrodes, respectively, from said end terminals, an input impedance having end and center taps, said end taps being connected, respectively, to said base electrodes, and second means for at times directly connecting said emitter electrodes to said input impedance center tap and for at other times connecting said emitters through an audio responder to said input impedance center tap.

6. A push-pull transistor circuit comprising a pair of transistors each having a first electrode, a second electrode and a third electrode, an output circuit comprising said first and second electrodes, an input circuit comprising said second and third electrodes, control means in said input and output circuits, said control means while in one condition causing said push-pull circuit to operate as an amplifier, said control means while in another condition causing said push-pull circuit to operate as a full wave detector.

7. A push-pull transistor circuit comprising a pair of transistors each having a first electrode, a second electrode, and a third electrode, an output circuit comprising said first and second electrodes, an input circuit comprising said second and third electrodes, control means in said input and output circuits, said control means while in one condition causing said push-pull circuit to operate as an amplifier, said control means while in another condition causing said push-pull circuit to operate as a full wave detector and a receiver device connected into said second to third electrode circuit when said control means is in its said another position.

8. A dual-purpose transistor circuit comprising a transistor having first, second and third electrodes, an output circuit comprising an output impedance connected to said first and second electrodes, an input circuit comprising an input impedance connected to said second and third electrodes, control means in said input and output circuits, a receiver device, said control means when in one condition causing said transistor input and output circuits to become active as an amplifier, and said control means when in another condition causing the interruption of said output circuit while at the same time connecting said receiver device into said input circuit.

9. In a transceiver, a dual-purpose transistor stage comprising a transistor having an emitter electrode, a base electrode and a collector electrode, means for biasing said emitter electrode with one polarity and said collector electrode with the opposite polarity each with respect to the base electrode, a highly frequency selective tuned circuit connected to said collector electrode, feedback circuit means for at times coupling said emitter electrode to said tuned circuit, loading means for at other times loading said tuned circuit changing its frequency selectivity, and switching means for at said times completing said feedback circuit means and for at said other times completing said loading means.

10. A dual-purpose oscillator amplifier transistor stage, comprising a transistor having an emitter electrode, a collector electrode, and a base electrode, an output circuit connected between said collector and base electrodes comprising a tuned circuit and a collector bias means, a winding coupled to said tuned circuit, control means for at times connecting said winding between said emitter and base electrodes for providing a feedback circuit for transistor stage operation as an oscillator, said control means at other times interrupting said feedback circuit and connecting a load means across said winding for loading said tuned circuit during transistor stage operation as an amplifier, and emitter bias means connected between the emitter and base electrodes for establishing proper emitter operating potential.

References Cited in the file of this patent

UNITED STATES PATENTS

| | | |
|---|---|---|
| 2,121,434 | Klinedinst et al. | June 21, 1938 |
| 2,173,427 | Scott | Sept. 19, 1939 |
| 2,414,795 | Brandt | Jan. 28, 1947 |
| 2,439,844 | Davis | Apr. 20, 1948 |
| 2,577,461 | Greefkes et al. | Dec. 4, 1951 |
| 2,632,812 | Cooney | Mar. 24, 1953 |
| 2,691,076 | Moore et al. | Oct. 5, 1954 |

OTHER REFERENCES

Electronic Design, July 1955 "Tube Transistor Radio," pages 48 and 49.

Tele-Tech, August 1953, vol. 12, issue No. 8, "A Portable Transistor F-M Receiver," pages 79, 206, 207.